(12) United States Patent
Edlund et al.

(10) Patent No.: US 8,498,961 B2
(45) Date of Patent: Jul. 30, 2013

(54) ON-DEMAND REPLICATION IN A CONTENT MANAGEMENT SYSTEM

(75) Inventors: Stefan Bengt Edlund, San Jose, CA (US); Tobin Jon Lehman, Cupertino, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/457,381

(22) Filed: Jul. 13, 2006

(65) Prior Publication Data

US 2008/0016129 A1 Jan. 17, 2008

(51) Int. Cl.
*G06F 17/30* (2006.01)

(52) U.S. Cl.
USPC .......................................................... 707/610

(58) Field of Classification Search
USPC ............... 707/100–104.1, 200–204, 610, 640
See application file for complete search history.

(56) References Cited

U.S. PATENT DOCUMENTS

| | | | |
|---|---|---|---|
| 6,591,266 B1 | 7/2003 | Li et al. | |
| 6,957,221 B1 * | 10/2005 | Hart et al. | 707/100 |
| 6,993,539 B2 * | 1/2006 | Federwisch et al. | 707/201 |
| 7,003,531 B2 * | 2/2006 | Holenstein et al. | 707/201 |
| 7,007,046 B2 * | 2/2006 | Manley et al. | 707/204 |
| 2002/0174142 A1 | 11/2002 | Demers et al. | |
| 2002/0184402 A1 | 12/2002 | Gangopadhyay et al. | |
| 2003/0088654 A1 | 5/2003 | Good et al. | |
| 2005/0289186 A1 | 12/2005 | Guo et al. | |

FOREIGN PATENT DOCUMENTS

WO 99/52044 A1 10/1999

OTHER PUBLICATIONS

Rinderle et al; "Effizient Vertraeglichkeitspruefung und automaticshe Migration von Workflow-Instanzen Bei der Evolution von Workflow-Schemata (Efficient Compliance and Automatic Migration of Workflow Instances with the Evolution of Workflow Schemata)" Informatik Forschung und Entwicklung, vol. 17, No. 4, pp. 177-197, Dec. 2002; http://www.informatik.uni-ulm.de/dbis/01/dbis/downloads/RRD02.pdf.

Nguyen et al.; "Schema Change Propagation in Object-Oriented Databases" Inst. Nat. Rec. Inf. Autom., Le Chesnay, France, Jun. 1989.

* cited by examiner

*Primary Examiner* — Huawen Peng
(74) *Attorney, Agent, or Firm* — IP Authority, LLC; Ramraj Soundararajan

(57) ABSTRACT

The system and method of the present invention provide for automatic on-demand replication in a replication cluster of content management servers. A replication manager of a content management server receives newly created, modified, and deleted application item types along with their associated physical tables and automatically forwards the received application item types on-demand to the replication managers of other content management servers of the replication cluster.

15 Claims, 3 Drawing Sheets

200

```
CM application 110 creates,
modifies, or deletes an application
item type.

202
```

↓

```
Schema manager 112 creates,
modifies, or deletes one or more
physical tables in the database
associated with the application item
type.

204
```

↓

```
Replication manager 114
automatically forwards the created,
modified, or deleted application item
type to the replication managers of
the other CM servers in the
replication cluster.

```
CM application 110 creates,
modifies, or deletes an application
item type.
302
```

```
Schema manager 112 creates,
modifies, or deletes one or more
physical tables in the database
associated with the application item
type, and records the changes in
change log 124.
304
```

```
Capture agent 120 captures the
changes recorded in change log
124 and automatically forwards
them on-demand to the apply
agents of the other CM servers in
the replication cluster.
306
```

```
Apply agent 158 of CM server 102
receives the changes sent by
capture agent 120 and passes them
to schema manager 152.
308
```

FIG. 3

… # ON-DEMAND REPLICATION IN A CONTENT MANAGEMENT SYSTEM

BACKGROUND OF THE INVENTION

1. Field of Invention

The present invention relates generally to the field of data replication. More specifically, the present invention is related to a system and method of automatic on-demand replication within a replication cluster of content management servers.

2. Discussion of Prior Art

Systems and methods are known in the art for replicating schema changes among content management servers of a replication cluster, however, in the systems and methods of the prior art, changes are not automatically replicated on-demand. U.S. patent application publication 2002/0174142 A1 to Demers et al. provides a method in which schema changes to object groups at a source site, including updates, inserts and deletes are propagated to one or more replication sites. U.S. patent application publication 2003/0088654 A1 to Good et al. provides a method of schema replication in which a change sequence number is computed that corresponds with updates made to the schema of a replication supplier that then initiates a replication session with a replication consumer. The schema of the replication consumer is updated, and then the consumer may propagate the updates to other replication consumers. U.S. patent application publication 2005/0289186 A1 to Guo et al. provides a method of replicating changes to a database schema using data declaration language (DDL) in which DDL commands are intercepted and the current state of the schema is saved before changes are made to the schema. However, none of the references teach a system and method in which schema changes are replicated automatically on-demand.

Whatever the precise merits, features, and advantages of the above cited references, none of them achieves or fulfills the purposes of the present invention.

SUMMARY OF THE INVENTION

The present invention provides a system performing automatic on-demand replication within a replication cluster of content management servers, each content management server comprising a content management application dynamically performing at least one of the creation, modification and deletion of an application item type, a schema manager handling at least one of the creation, modification, and deletion of a physical table storing the application item type, and a replication manager receiving the application item type and associated physical table, and automatically forwarding said received application item type on-demand to replication managers of other content management servers within the replication cluster.

Additionally, the present invention provides a method of performing automatic on-demand replication within a replication cluster of content management servers, a content management server of the replication cluster executing the following steps: dynamically performing at least one of the creation, modification, and deletion of an application item type; handling at least one of the creation, modification and deletion of a physical table storing the application item type; and automatically forwarding said application item type on-demand to replication managers of other content management servers of the replication cluster.

The present invention also provides for an article of manufacture comprising a computer usable medium having computer readable program code embodied therein which implements in conjunction with a computer system the above-mentioned method of the invention.

BRIEF DESCRIPTION OF THE DRAWINGS

FIG. 2 illustrates the present invention's method in which changes are propagated through a content management server and then automatically forwarded on-demand to other content management servers of a replication cluster.

FIG. 3 illustrates a method of replicating schema changes according to another embodiment of the invention.

DESCRIPTION OF THE PREFERRED EMBODIMENTS

Figure 1:
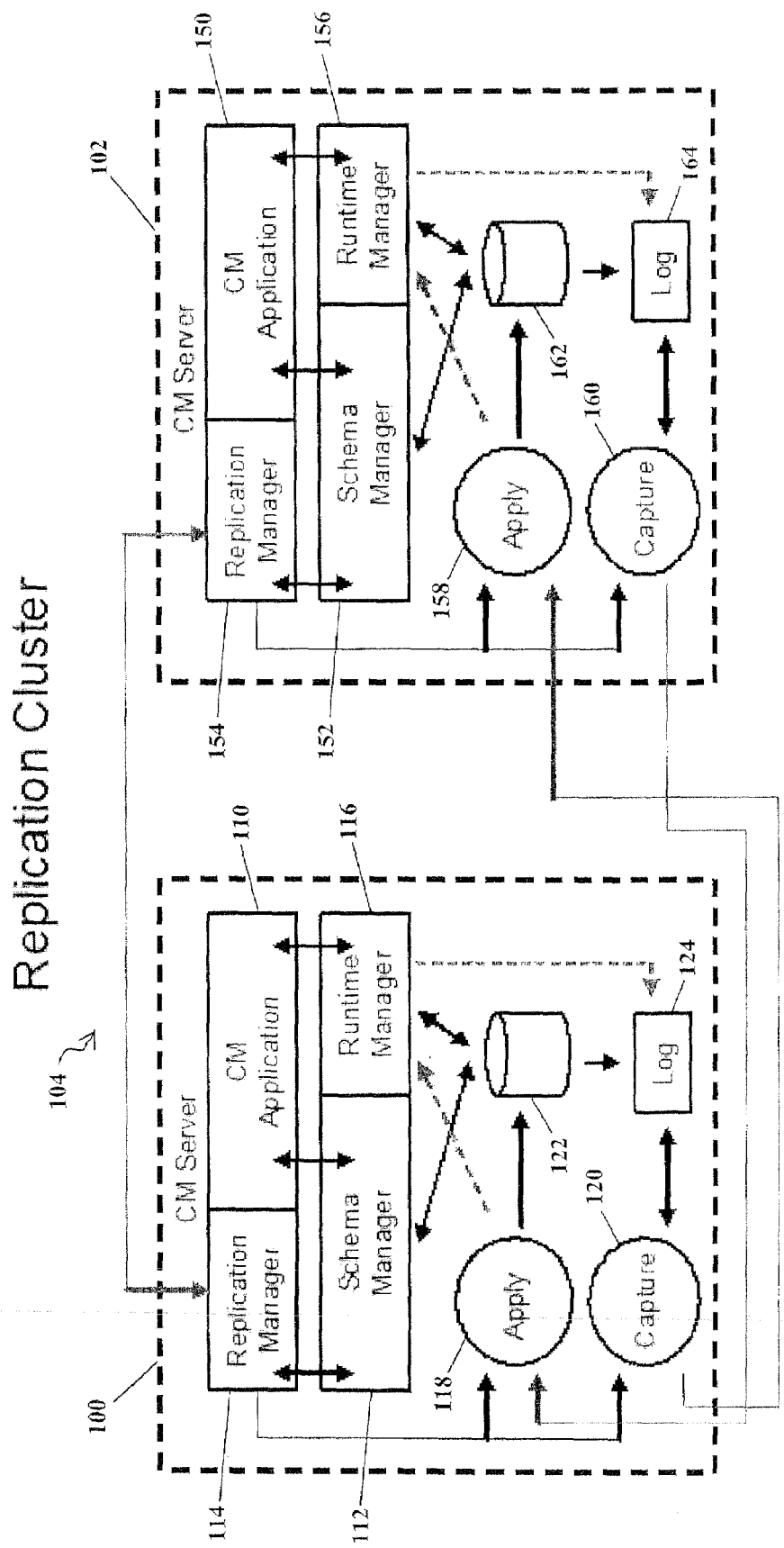
FIG. 1 illustrates an exemplary embodiment of the content management server of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

A single server including a CPU, database application and storage memory, manages both structured and unstructured information and functions as a content management (CM) server of the present invention and provides automatic on-demand replication in a content management system. As illustrated in FIG. 1, CM server 100 comprises content management (CM) application 110, schema manager 112, replication manager 114, runtime manager 116, apply agent 118, capture agent 120, database 122 and log 124. Additionally, FIG. 1 shows a second CM server 102 that together with CM server 100 forms replication cluster 104. A replication cluster is a collection of a plurality of CM servers that are kept in sync. Although only two CM servers are shown in FIG. 1, this is for illustrative purposes only and it is to be understood that any number CM servers may form a replication cluster. Additionally, the CM servers of the replication cluster communicate by means of any suitable network (not shown) which can be one of but not limited to a LAN, a WAN, or a SAN.

CM application 110 of CM server 100 dynamically creates, modifies, and deletes application item types that define the structure of application objects stored by the content management system in database 122. The creation, modification and deletion of application item types results in changes to the schema of database 122. As shown in FIG. 1, CM application 110 interacts with schema manager 112 and runtime manager 116. Schema manager 112 manages the physical tables in database 122 for storing application item types defined by CM application 110. In addition to interacting with the CM application, schema manager 112 interacts with replication manager 114 whose function will be described shortly. Updates to database 122 that are not schema changes are applied by runtime manager 116. Additionally, runtime manager 116 records these updates to the database in change log 124. The database updates stored in change log 124 are communicated to the other CM servers of the replication cluster through the interaction of capture agents and apply agents. Capture agents, such as capture agent 120 of CM server 100, capture the database updates recorded in change log 124 and forward the captured updates to the apply agents of other CM servers, such as apply agent 158 of CM server 102. Apply agents, such as apply agent 118 of CM server 100, apply the updates that are received from the capture agents of other CM servers, such as capture agent 160 of CM server 102, to the local database which is in this case database 122 of CM server 100. In this manner, non-schema updates to the databases of the replication cluster are replicated to the other CM servers of the cluster.

In a first embodiment of the invention, the replication manager of the CM server is responsible for communicating schema changes to the other CM servers of the replication cluster. Referring back to FIG. 1, replication manager 114 of CM server 100 receives the newly created, modified, or deleted application item types and associated tables from schema manager 112 and automatically forwards the received application item types on-demand to the replication managers of other CM servers, such as replication manager 154 of CM server 102. Additionally, replication manager 114 informs capture agent 120 of new application item types so that the capture agent can capture any updates to the tables associated with the new application item types, and if needed, the replication manager also informs apply agent 118 of the new application item types so that the apply agent can prepare to update the associated tables when needed. The replication manager also deregisters deleted application item types and associated tables with the capture agent.

FIG. 2 illustrates an exemplary method 200 of replicating schema changes according to the first embodiment of the invention. In step 202, CM application 110 creates, modifies, or deletes an application item type which is then passed to schema to manager 112. In step 204, schema manager 112, creates, modifies, or deletes physical tables in database 122 corresponding with the received application item type, and then forwards the application item type and associated tables to replication manager 114. In step 206, replication manager 114 automatically forwards the received application item type on-demand to the replication managers of other CM servers within the replication cluster. Additionally, the replication manager informs the local capture agent and the local apply agent as needed of new application item types, and deregisters deleted application item types and associated tables with the capture agent.

In a second embodiment of the invention schema manager 112 records schema changes in change log 124. Capture agent 120 captures the schema changes recorded in the change log and automatically forwards the schema changes on-demand to the apply agents of the other CM servers in the replication cluster, such as apply agent 158 of CM server 102. Apply agent 158 receives the schema changes and passes them to schema manager 152 of CM server 102, which in turn applies the schema changes to database 162.

FIG. 3 illustrates an exemplary method of replicating schema changes according to the second embodiment of the invention. In step 302, CM application 110 creates, modifies, or deletes an application item type which is then passed to schema manager 112. In step 304, schema manager 112, creates, modifies, or deletes physical tables in database 122 corresponding with the received application item type and then records the changes in change log 124. In step 306, capture agent 120 captures the changes recorded in the change log and automatically forwards the changes on-demand to the apply agents of the other CM servers in the replication cluster, such as apply agent 158 of CM server 102. In step 308, the changes are received by apply agent 158 and are then passed to schema manager 152.

Additionally, the present invention provides for an article of manufacture comprising computer readable program code contained within implementing one or more modules to perform automatic on-demand replication within a replication cluster of content management servers. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices. Implemented in computer program code based products are software modules for:

(a) dynamically performing at least one of the creation, modification and deletion of application item types;

(b) handling at least one of the creation, modification and deletion of at least one physical table storing the application item type; and (c) automatically forwarding said application item type on-demand to replication managers of other content management servers of the replication cluster.

CONCLUSION

A system and method has been shown in the above embodiments for the effective implementation of a system and method performing ON-DEMAND REPLICATION IN A CONTENT MANAGEMENT SYSTEM. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the number of content management servers forming the replication cluster, or by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of data replication.

What is claimed:

1. A system performing automatic on-demand replication within a replication cluster of content management servers, each content management server comprising non-transitory computer readable storage medium having:

computer readable program code determining structure of at least one application object type stored within;

computer readable program code implementing a content management application dynamically performing at least one of the creation, modification and deletion of an application item type according to said determined structure of said at least one application object;

computer readable program code implementing a schema manager handling at least one of the creation, modification, and deletion of at least one physical table associated with the application item type; and computer readable program code implementing a replication manager receiving the application item type and associated physical table;

computer readable program code automatically forwarding, on-demand, said received application item type defining said determined structure of said at least one application object to at least one replication manager of at least one other content management server within the replication cluster, wherein said replication manager of said at least one other content management server updates corresponding physical table associated with said received application item type or deregisters said received application item type and corresponding table associated with said received application item type; and wherein each content management server further comprises a capture agent wherein said replication manager informs said capture agent of new application item types, and wherein said replication manager deregisters deleted application item types and associated physical tables with said capture agent.

2. The system of claim 1, each content management server further comprising an apply agent wherein said replication manager additionally informs said apply agent of new application item types.

3. The system of claim 2 wherein said capture agent communicates with apply agents of other content management servers of the replication cluster.

4. The system of claim 3 wherein said capture agent captures updates to a database that are recorded in a change log and automatically forwards said updates on-demand to the apply agents of said other content management servers of the replication cluster.

5. The system of claim 4 wherein said apply agent directly applies updates received from capture agents of said other content management servers of the replication cluster to said database.

6. The system of claim 4 wherein said apply agent invokes a runtime manager to apply updates received from capture agents of other content management servers of the replication cluster to said database.

7. The system of claim 1, further comprising a network wherein said network is a LAN, WAN or SAN.

8. A method of performing automatic on-demand replication within a replication cluster of content management servers, a content management server of the replication cluster executing the following steps:

determining structure of at least one application object type stored within;

dynamically performing at least one of the creation, modification, and deletion of an application item type according to said determined structure of said at least one application object;

handling at least one of the creation, modification and deletion of at least one physical table associated with the application item type;

automatically forwarding, on-demand, said application item type defining said determined structure of said at least one application object to at least one replication manager of at least one other content management server within the replication cluster, wherein said replication manager of said at least one other content management server updates corresponding physical table associated with said received application item type or deregisters said received application item type and corresponding table associated with said received application item type; and wherein each content management server further comprises a capture agent wherein said replication manager informs said capture agent of new application item types, and wherein said replication manager deregisters deleted application item types and associated physical tables with said capture agent.

9. The method of claim 8, further comprising the step of informing an apply agent of new application item types wherein said replication manager informs said apply agent of the new application item types upon receiving them.

10. The method of claim 9 further comprising the steps of:

capturing updates to a database which are recorded in a change log;

automatically forwarding said updates on-demand to other content management servers of said replication cluster; and applying updates that are received from said other content management servers of said replication cluster to said database;

wherein the capture agent captures updates to said database that are recorded in said change log and automatically forwards said updates on-demand to apply agents of said other content management servers of the replication cluster.

11. The method of claim 10 wherein said apply agent directly applies updates received from capture agents of said other content management servers of the replication cluster directly to said database.

12. The method of claim 10 wherein said apply agent invokes a runtime manager to apply updates received from capture agents of said other content management servers of the replication cluster to said database.

13. The method of claim 10 wherein schema changes to a database resulting from the addition, modification and deletion of application item types are recorded in said change log wherein the recorded changes are captured by said capture agent and automatically forwarded on-demand to apply agents of said other content management servers of the replication cluster, and wherein said apply agent passes schema changes that are received from capture agents of said other content management servers of the replication cluster to a schema manager.

14. The method of claim 10 wherein schema changes to a database resulting from the addition, modification, and deletion of application item types are automatically forwarded on-demand by a replication manager to replication managers of said other content management servers of said replication cluster.

15. The method of claim 8 wherein said content management servers of a replication cluster communicate over a network wherein said network is a LAN, WAN or SAN.

* * * * *